Feb. 28, 1967    P. P. CHAFFIOTTE    3,306,032
SUPERCHARGED DIESEL ENGINE
Filed March 10, 1965    2 Sheets-Sheet 1

United States Patent Office 3,306,032
Patented Feb. 28, 1967

3,306,032
SUPERCHARGED DIESEL ENGINE
Pierre Philippe Chaffiotte, Cormeilles-en-Parisis, France, assignor to Societe d'Exploitation des Materiels Hispano-Suiza, Bois Colombes (Seine), France, a society of France
Filed Mar. 10, 1965, Ser. No. 438,477
Claims priority, application France, Mar. 16, 1964, 967,566
8 Claims. (Cl. 60—13)

The present invention relates to supercharged Diesel engines wherein atmospheric air or any comburent gas is compressed in at least one supercharging compressor, and then cooled in at least one heat exchanger before being admitted into the engine.

The invention is more especially but not exclusively concerned with diesel engines of this kind used for propelling heavy vehicles, for instance railroad vehicles.

The object of the present invention is to provide an engine of this kind which is better adapted to meet the requirements of practice, especially concerning the available power.

Such engines comprise:

First, at least one supercharging compressor,

Secondly, at least one heat exchanger, called "primary exchanger," in which the compressed air from the supercharging compressor yields heat to a cold fluid (fluid of the engine cooling circuit or of an independent cooling circuit), and Thirdly, at least one supplementary heat exchanger, called "secondary exchanger," consisting of the evaporator of a refrigerator of the compressor type, in which secondary exchanger the compressed air issuing from the primary exchanger yields heat to the refrigerant fluid circulating through said refrigerator.

The essential feature of the present invention consists in arranging the means through which the refrigerator is driven by the internal combustion engine in such manner that it is possible to vary the performance of this refrigerator independently of the speed at which said internal combustion engine is running, whereby it is possible, when the load of said internal combustion engine is to increase, to act upon said refrigerator so that it supplies an increased refrigerating power when the internal combustion engine is accelerated to comply with the load increase.

Preferred embodiments of the present invention will be hereinafter described with reference to the appended drawings, given merely by way of example, and in which.

Figure 1:
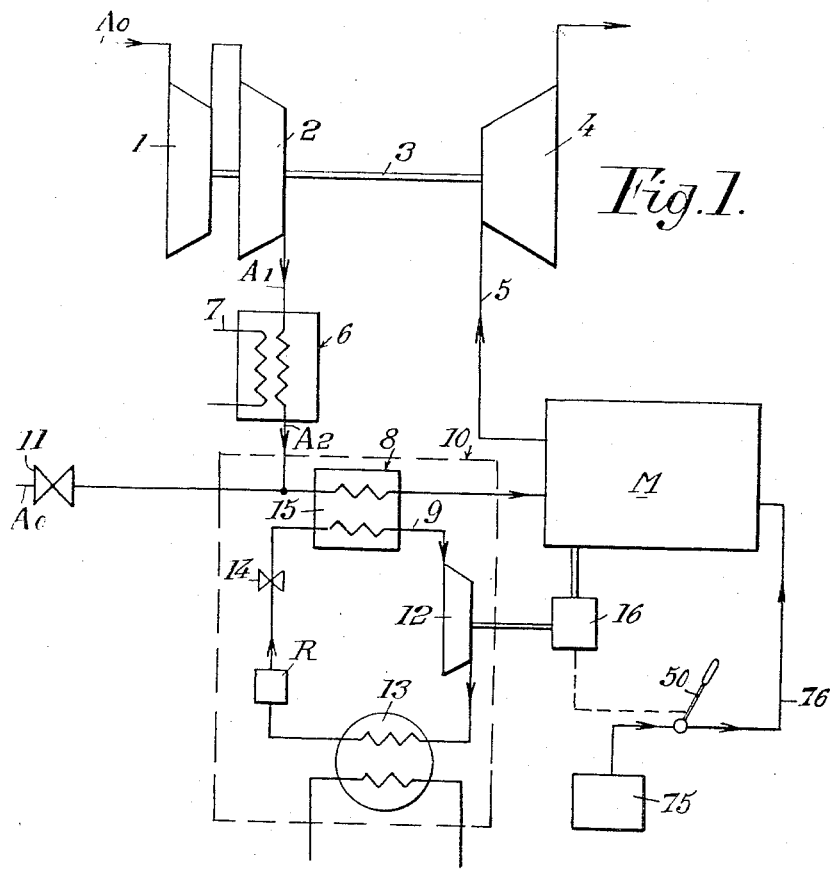
FIG. 1 is a diagrammatical view of the air feed circuit of a diesel engine made according to the present invention.

The internal combustion engine, preferably a diesel engine, is shown at M. The air feed circuit of this engine M includes, as shown by FIG. 1, the following elements:

(a) A turbo-compressor unit comprising two compressors 1 and 2, for instance of the centrifugal type, mounted on a common shaft 3, through which air $A_0$ admitted at atmospheric pressure and temperature circulates in series; shaft 3 is driven by a turbine 4, for instance of the axial type, the power fluid of which is supplied by the exhaust gases 5 from internal combustion engine M;

(b) A primary exchanger 6 in which the hot air $A_1$ issuing from compressor 2 yields heat to a cold fluid circuit 7 which is for instance the cooling circuit of internal combustion engine M (it might be an independent cooling circuit); and (c) a secondary heat exchanger 8 wherein the hot compressed air $A_2$ issuing from primary exchanger 6 yields heat to a cold fluid, which is the refrigerant fluid flowing through the circuit of a refrigerator 10 including a compressor 12, a condenser 13, an expansion valve 14 and an evaporator 15 which constitutes the secondary heat exchanger 8 above referred to.

Now, according to the present invention, the compressor 12 of the refrigerator 10 is driven, through a transmission device 16, from engine M, said transmission device 16 being adapted to permit variations of performance of refrigerator 10 independently of the conditions of operation of engine M.

It is then possible, if an increase of the load of engine M is foreseen, to act, beforehand, upon refrigerator 10, so that it supplies a greater refrigerating power when engine M is accelerated in order to comply with the load increase that has been foreseen.

The supplement of work thus supplied by refrigerator 10 may advantageously be stored up in a chamber R disposed in the circuit 9 of the refrigerant fluid upstream of the expansion valve 14 which itself is located upstream of the evaporator 15 constituting the secondary exchanger 8.

Advantageously, shown by FIG. 1, the air feed circuit of engine M is provided with a valve 11 which makes it possible, when said engine is accelerated, to provide a direct admisson to the engine of air $A_0$ at atmospheric pressure and temperature. This valve 11 is located so that this last mentioned air $A_0$ is admitted between primary exchanger 6 and secondary exchanger 8, being thus cooled by secondary exchanger 8.

Transmission device 16 advantaegously consists, as diagrammatically shown by FIG. 1 of a continuous variator, of the mechanical, hydraulic or electric kind, which is controlled through means responsive to the position of the part which adjusts the injection of fuel into internal combustion engine M. Said part will be supposed to consist of a handle 50. Under control of this handle, fuel from tank 75 is admitted through conduit 76 into engine M.

FIGS. 2 to 5 show four possible embodiments of such a system.

Figure 2:
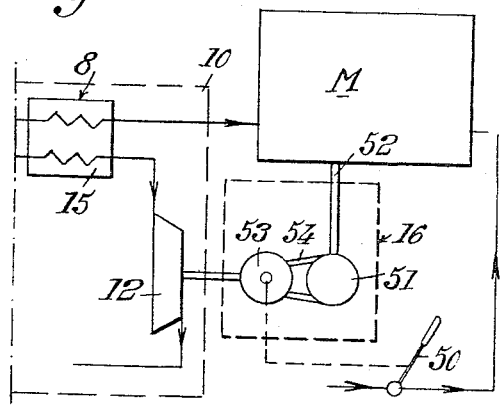
FIGS. 2, 3, 4 and 5 are diagrammatical views illustrating different embodiments of an important element of the air feed circuit illustrated by FIG. 1.

According to the embodiment of FIG. 2, transmission device 16 consists of a mechanical variator making use of a belt of trapezoidal section.

Such a variator comprises,

On the one hand, an axially displaceable pulley 51 directly driven by a shaft 52 from engine M, and, On the other hand, an axially displaceable pulley 53 driven through belt 54 by pulley 51 and keyed on the shaft of the compressor 12 of refrigerator 10.

Control of the variator, for instance through pulley 53, is effected from handle 50.

Figure 3:
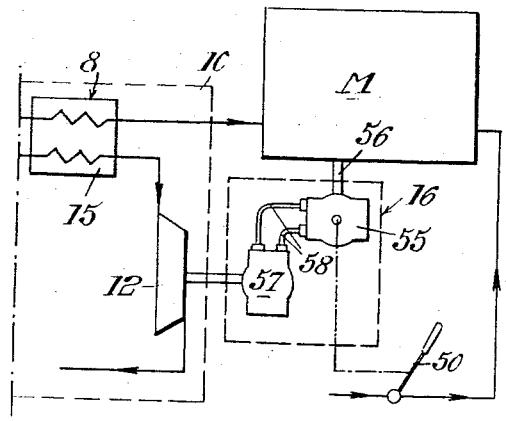

According to the embodiment of FIG. 3, transmission device 16 consists of a hydraulic variator including a pump and an engine. This variator comprises:

On the one hand, a hydraulic pump 55 directly driven by an output shaft 56 of engine M, said hydraulic pump being provided with means for adjusting its flow rate, and, On the other hand, a hydraulic motor 57 fed, from pump 55, with power liquid circulating through pipes 58, said motor 57 driving the shaft of the compressor 12 of refrigerator 10.

The flow rate of hydraulic pump 55 is controlled in accordance with the position of handle 50.

Figure 4:
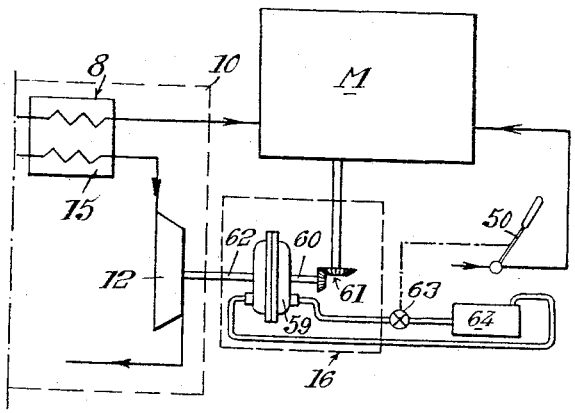

In the embodiment of FIG. 4, the transmission device 16 of FIG. 1 consists of a hydraulic coupling device 59, the input shaft 60 of which is driven by engine M through a speed multiplying conical gear 61, and the output shaft 62 of which directly drives the shaft of the compressor 12 of refrigerator 10.

Means consisting for instance of a valve 63 interposed between hydraulic coupling 59 and a reserve 64 of liquid, permit of varying the amount of liquid fed to said hydraulic coupling 59, said valve 63 being controlled from handle 50.

Figure 5:
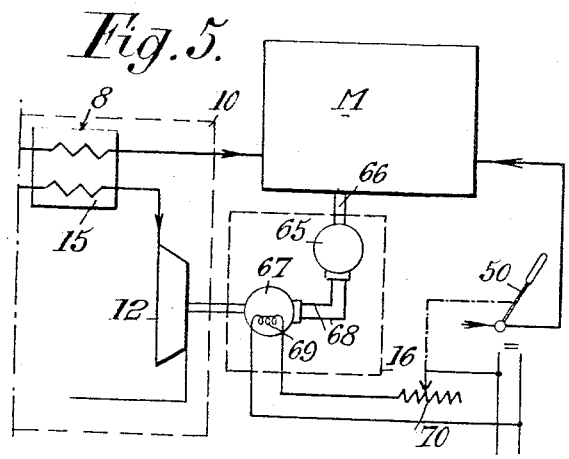

Finally, in the embodiment of FIG. 5, the transmission device 16 of FIG. 1 is an electric variator comprising:

On the one hand, a direct current generator 65 directly driven by an output shaft 66 of engine M, and, On the other hand, a direct current motor 67 fed with current from generator 65 through connections 68 and which drives the shaft of the compressor 12 of refrigerator 10, said direct current motor 67 being provided with an inductor circuit 69 including a variable resistor 70.

This variable resistor is controlled in accordance with the position of handle 50.

In a general manner, while the above description discloses what is deemed to be practical embodiments of the invention, said invention is not limited thereto as there might be changes made in the arrangement, disposition and form of the parts without departing from the principle of the invention as comprehended within the scope of the appended claims.

What I claim is:

1. In combination,
    an internal combustion engine having an air intake,
    means for feeding air to said internal combustion engine air intake including,
    a supercharging compressor having its input open to the atmosphere,
    a first heat exchanger including an air circuit having its input connected to the output of said supercharging compressor and a cooling fluid closed circuit mounted for heat interchange with said air circuit,
    a refrigerator including a refrigerant fluid circuit comprising in series a refrigerant fluid compressor, a condenser, an expansion valve and an evaporator,
    a second heat exchanger including an air circuit having its input connected to the air output of said first heat exchanger, said second heat exchanger air circuit being mounted for heat interchange with the portion of said refrigerant fluid circuit between said expansion valve and the input of said refrigerant fluid compressor,
    the output of said second heat exchanger air circuit being connected with the air intake of said internal combustion engine, and
    means for transmitting motive power from said internal combustion engine to said refrigerant fluid compressor, said motive power transmitting means comprising a torque variator.

2. A combination according to claim 1 further comprising, in said refrigerant fluid circuit a storing chamber located upstream of said expansion valve.

3. A combination according to claim 1 further including a supplementary air feed conduit having its input open to the atmosphere and opening into said air feeding means at a point thereof located between said first heat exchanger and said second heat exchanger.

4. In combination,
    an internal combustion engine having an air intake,
    means for feeding air to said internal combustion engine air intake including,
    a supercharging compressor having its input open to the atmosphere,
    a first heat exchanger including an air circuit having its input connected to the output of said supercharging compressor and a cooling fluid circuit mounted for heat interchange with said air circuit,
    a refrigerator including a refrigerant fluid closed circuit comprising in series a refrigerant fluid compressor, a condenser, an expansion valve and an evaporator,
    a second heat exchanger including an air circuit having its input connected to the air output of said first heat exchanger,
    said second heat exchanger air circuit being mounted for heat interchange with the portion of said refrigerant fluid circuit between said expansion valve and the input of said refrigerant fluid compressor,
    the output of said second heat exchanger air circuit being connected with the air intake of said internal combustion engine,
    means for transmitting motive power from said internal combustion engine to said refrigerant fluid compressor, said motive power transmitting means comprising a torque variator,
    means for feeding fuel to said internal combustion engine,
    control means for varying the flow rate of fuel through said fuel feeding means, and
    means for operatively connecting said torque variator with said fuel flow control means.

5. A combination according to claim 4 wherein said means for transmitting motive power from said internal combustion engine to said refrigerant fluid compressor consist of a mechanical variator comprising a first conical pulley, displaceable along its axis, operatively connected with said internal combustion engine for being driven in rotation by it, a second conical pulley, displaceable along its axis, operatively connected with the shaft of said refrigerant fluid compressor and a trapezoidal transmission belt mounted for operatively connecting said two pulleys together, the means for operatively connecting said torque variator with said fuel flow rate control means consisting of means responsive to the movements of said fuel flow rate control means for moving one of said pulleys along its axis.

6. A combination according to claim 4 wherein said means for transmitting said motive power from said internal combustion engine to said refrigerant fluid compressor consist of a hydraulic variator comprising a pump operatively connected with said internal combustion engine for being driven by it, means for adjusting the flow rate of said pump, and a hydraulic motor fed with liquid from said pump and keyed on the shaft of said refrigerant fluid compressor, the means for operatively connecting said torque variator with said fuel flow rate control means consisting of means responsive to the movements of said fuel flow rate control means for varying the flow rate of said pump.

7. A combination according to claim 4 wherein said means for transmitting motive power from said internal combustion engine to said refrigerant fluid compressor consist of a hydraulic coupling device comprising an input shaft driven in rotation by said internal combustion engine and an output shaft coupled with the shaft of said refrigerant fluid compressor, a valve for varying the amount of liquid introduced in said hydraulic coupling, the means for operatively connecting said torque variator with said fuel flow rate control means consisting of means responsive to the movements of said fuel flow rate control means for operating said last mentioned valve.

8. A combination according to claim 4 wherein said means for transmitting motive power from said internal combustion engine to said refrigerant fluid compressor consist of an electrical variator comprising a direct current generator operatively connected with said engine to be driven by it, a direct current motor fed with current from said generator and operatively connected with said refrigerant fluid compressor for driving it, and an inductor circuit for said direct current motor, said inductor circuit comprising a variable resistor, the means for operatively connecting said torque variator with said fuel flow rate control means consisting of means responsive to the movements of said fuel flow rate control means for varying said resistor.

References Cited by the Examiner

UNITED STATES PATENTS 3,141,293   7/1964   Crooks _____ 60—13

MARK NEWMAN, *Primary Examiner.*

R. D. BLAKESLEE, *Assistant Examiner.*